United States Patent [19]
Mandziak

[11] 3,715,567
[45] Feb. 6, 1973

[54] LIQUID HEATING ASSEMBLY

[76] Inventor: Ronald S. Mandziak, 85 Albert Avenue, Toronto, Ontario, Canada

[22] Filed: Nov. 4, 1970

[21] Appl. No.: 86,829

[52] U.S. Cl. .............219/437, 99/281, 219/328, 219/335, 219/442, 219/512, 219/541, 337/381
[51] Int. Cl. ......H05b 1/02, A47j 27/21, H01h 37/22
[58] Field of Search ............219/432, 435–438, 219/441, 442, 512, 510, 494, 536, 541, 328, 331, 322, 335, 336, 337; 337/380, 381, 374, 375, 377; 99/281

[56] References Cited

UNITED STATES PATENTS

| | | | |
|---|---|---|---|
| 2,189,127 | 2/1940 | Brannon | 219/441 |
| 2,274,930 | 3/1942 | Newton | 219/437 X |
| 1,990,546 | 2/1935 | Hubbard | 219/441 |
| 2,511,848 | 6/1950 | Hill | 219/328 X |
| 2,541,321 | 2/1951 | Badger | 219/436 |
| 3,231,717 | 1/1966 | Moorhead | 219/441 |

FOREIGN PATENTS OR APPLICATIONS

| | | | |
|---|---|---|---|
| 1,331,376 | 5/1963 | France | 219/437 |
| 923,118 | 4/1963 | Great Britain | 337/381 |
| 734,077 | 5/1966 | Canada | 219/437 |
| 622,395 | 5/1949 | Great Britain | 337/381 |

Primary Examiner—A. Bartis
Attorney—Arne I. Fors, Frank I. Piper and James T. Wilbur

[57] ABSTRACT

An electric liquid heating assembly having a dome shaped upper wall and a flat bottom. A false bottom is mounted within the liquid heating assembly and defines a liquid-tight compartment. The false bottom is composed of a top wall and a lip. The top wall is spaced apart from the liquid heating assembly bottom and disposed parallel thereto and has an area substantially less than the area of the liquid heating assembly bottom. The lip depends downwardly from the top wall to the liquid heating assembly bottom. A thermo-sensitive element is mounted within the compartment and includes a resilient conductor, an insulator mounted to the conductor and a bi-metallic strip. When the temperature of the liquid within the liquid heating assembly exceeds a predetermined temperature, the bi-metallic strip contacts the insulator thereby applying a force to the conductor opposed to its bias and causing a contact, secured to the conductor, to move away from an electric terminal thereby de-energizing a heating element mounted with the liquid heating assembly.

2 Claims, 4 Drawing Figures

Inventor

RONALD S. MANDZIAK

Inventor
RONALD S. MANDZIAK

LIQUID HEATING ASSEMBLY

This invention relates to electric kettles and is particularly directed to improvements in the structure and in the manner of assembly of thermostatically controlled electric kettles.

The present invention will be described in detail with respect to a hot water kettle; however, the present invention is adapted for use on electric coffee pots and the like.

Conventional electric kettles have a waterproof compartment located at the bottom and separated from the water-containing space by so-called false bottoms. Located within the compartments are such elements as thermostatic controls and electric wires interconnecting the heating element, thermostatic control and electric terminals. The false bottoms are usually spaced from and extend substantially parallel to the base of the kettles across their entire cross-section.

A conventional electric kettle is dome shaped and has a flat base. The cross-section of the kettle is normally greatest at its base and the waterproof compartment is defined by the base and the false bottom. The volume of the compartment as compared to the total volume of the kettle is substantial.

In addition, a significant amount of material is required in the construction of the false bottom. The cost of the false bottom is therefore a material factor in the total cost of conventional kettles. Moreover, conventional electric kettles are relatively complicated of construction as a result of the necessity of providing false bottoms therein.

It is accordingly a principal object of the present invention to provide an electric kettle having a substantially greater capacity than that of a conventional kettle having the same exterior dimensions. The cost of materials for the kettle of the invention is significantly less than the cost for conventional kettles.

It is another object of the invention to provide an electric kettle having a false bottom which defines in part a compartment which is substantially smaller than corresponding compartments in conventional kettles of the same dimensions.

It is another object to provide a false bottom for a kettle which requires significantly less material in its construction than false bottoms of conventional kettles.

It is another object to provide an electric kettle which is simple of manufacture and involves few operational steps in its construction.

A further object is to provide a kettle having a simplified thermostatic control therein.

These and other objects may be accomplished by providing in an electric kettle assembly including a container for liquid having inner and outer surfaces, a generally planar lower wall, a side wall extending normally and upwardly from said lower wall and terminating at an upper wall, said upper wall being in opposed relation to said lower wall, the improvement characterized by a false bottom which is secured to the inner surface of said body and which has a top and a lip integral therewith, said top being in spaced relation with said lower wall but having an area substantially less than that of said lower wall, said top further having an outer edge conforming to a portion of the inner side wall and secured thereto, said lip depending downwardly from said top and secured to said side and lower walls whereby said false bottom and that portion of said container wall extending downwardly and disposed beneath said false bottom define a liquid-tight compartment.

In the electric kettle, according to another aspect of the present invention, which kettle includes a heating element disposed within the container and having an electric terminal at each end thereof, one end being adapted to be connected to one line of a source of electric current, a thermo sensitive element is mounted within the compartment, which element includes a resilient conductor adapted to be connected to the other line of the source of electric current and having a contact adapted to make and to break electrical connection with the other electric terminal of said heating element, said resilient conductor being pivotally mounted within said compartment, an insulator contacting said conductor, a bi-metallic strip mounted within said compartment and having one end adapted to contact said insulator, said strip contacting said insulator thereby applying a force to said conductor opposed to its bias and causing said contact to move away from said other electric terminal when the temperature of the liquid exceeds a predetermined temperature.

A fuller understanding of the invention may be had by referring to the following description of a preferred embodiment of the present invention and claims taken in conjunction with the accompanying drawing in which:

Like reference characters refer to like parts throughout the description of the drawing.

Figure 1:
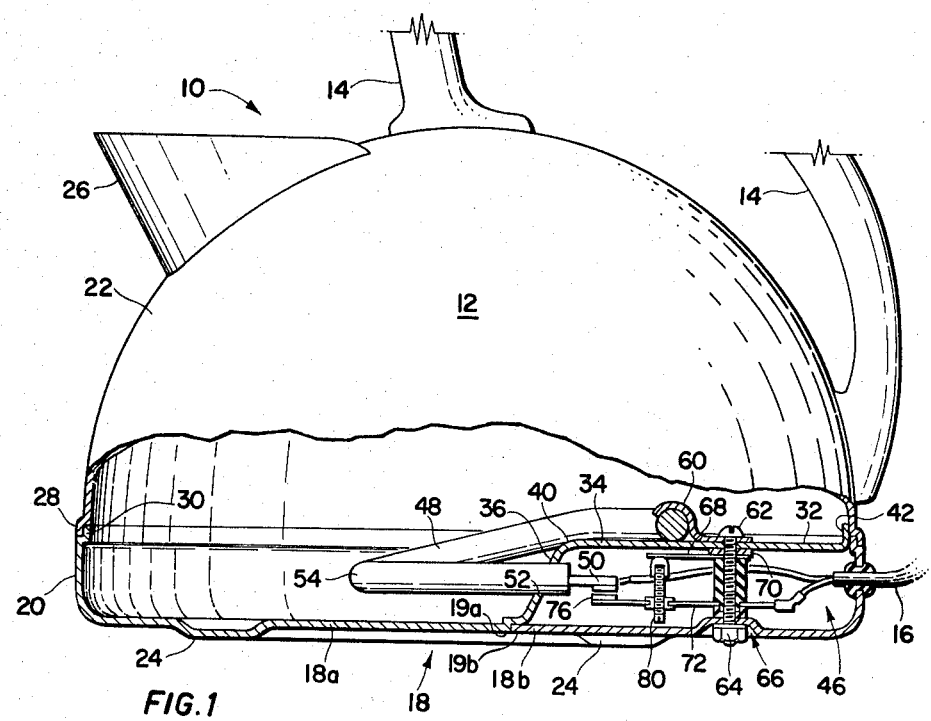
FIG. 1 is an elevation, partly in section, of the material portions of the electric kettle according to the invention.

With reference to the drawing, the electric kettle according to the invention is indicated generally 10 and comprises a container 12, a handle 14 (a portion only is illustrated) and an electric cord 16.

Container 12 comprises a lower wall generally 18, side wall 20 and upper wall 22. Lower wall 18 preferably has a generally circular periphery and has a plurality of downwardly depending feet 24. Wall 18 is composed of two portions, 18a and 18b having interconnected edges 19a and 19b. Portion 18a is integral with false bottom 32, described hereinafter. Portions 18a and b terminate at side wall 20.

Side wall 20 is preferably annular in shape and extends generally normally and upwardly from wall 18 and terminates at upper wall 22. Wall 22 is generally in the shape of a dome and has a spout 26 fastened thereto. Preferably upper wall 22 at its lower edge terminates in an outwardly stepped flange 28. Side wall 20 preferably terminates at its upper edge in an inwardly stepped flange 30 which is adapted to frictionally engage the inside wall of flange 28 when connected as shown in FIG. 1. The two flanges 28 and 30 may be secured to one another by brazing, soldering or other means to ensure a sealing connection between side and upper walls 20 and 22.

The side and walls may be joined by other means such as deep drawing wall 20 upwardly to overlap wall 22.

Handle 14 and spout 26 may be secured to container 12 in a variety of ways all well known to those skilled in the art.

Figure 2:
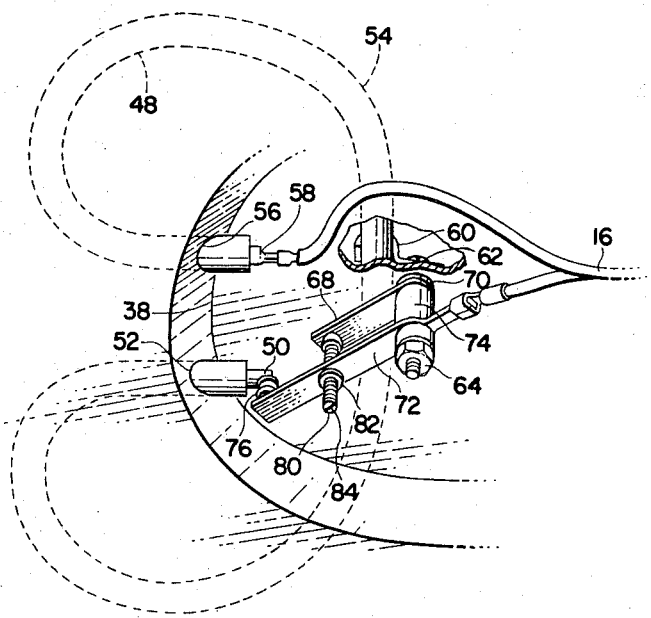
FIG. 2 is a fragmentary perspective view of the inner-lower portion of the kettle looking upward from the bottom thereof.
Figure 3:
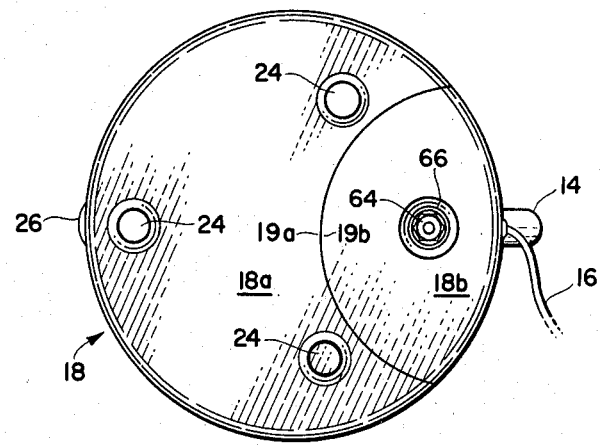
FIG. 3 is a bottom view of the electric kettle.

A false bottom generally indicated 32 is mounted within container 12. Bottom 32 is composed of two portions, a top 34 and a lip 36. Top 34 is bounded by a curved edge 38 (FIG. 2) and a straight edge 40 (FIG. 1). The curvature of edge 32 is the same as that of the inner surface of the container to which the top is secured and, as seen in FIG. 1, top 34 terminates in an upwardly projecting flange 42 to provide a surface which may be easily joined by conventional means to the container. As is readily apparent, the area of top 34 is substantially less than the area of lower wall 18.

Lip 36 commences at edge 40, depends downwardly to contact wall 18b, extends laterally and terminates at the end of wall 18b. The lip is integral with wall 18a. The two side edges of lip 36 contact and are secured to the inner surface of the side wall 20. A flange is also formed at these edges to facilitate joining to the inner surface. Thus the false bottom and those portions of the wall extending downwardly and disposed beneath the false bottom define a liquid-tight compartment 46.

False bottom 32 and portion 18a of the lower wall are preferably formed of one continuous sheet of material which commences at flange 42 and terminates at flange 30. Portion 18b of the lower wall and that portion of side wall 20 integral therewith are composed of another sheet of material. Where the walls are constructed as described, the assembly of the various parts which make up the kettle is extremely rapid.

An elongated heating element 48 is mounted within the container. Element 48 commences at electric terminal 50 within compartment 46, extends outwardly through aperture 52 in lip 36 to the liquid containing space of the container at intermediate portion 54. The element returns through a second aperture 56 (FIG. 2) and terminates at electric terminal 58. Heating element 48 is held in position within the kettle by means of a bracket 60 which is secured to false bottom 32 by means of a stud 62.

Figure 4:
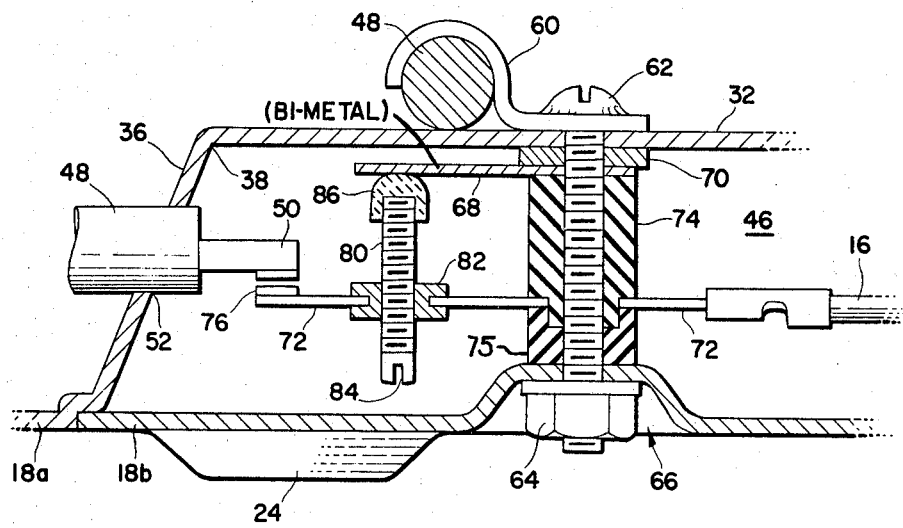
FIG. 4 is a section, in enlarged scale, of the waterproof compartment of the kettle.

With reference to FIG. 4, stud 62 depends downwardly from false bottom 32 and through an aperture in lower wall 18 and is held in position by a nut 64 which tightens into a recess 66 formed in the lower wall. A thermo-sensitive strip 68 is secured to the stud and a washer 70 is spaced between the strip and false bottom 32.

A resilient conductor 72 is held in spaced relation with strip 68 and lower wall 18 by stud 62. A ceramic insulator 74 however separates the stud from conductor 72 so that it is electrically insulated from the stud. A second insulator 75 insulates conductor 72 from lower wall 18b. One end of conductor 72 is secured to a line of electric cord 16 and the other end of the conductor has a contact 76 secured thereto. When conductor 72 is in a normal unstressed state, contact 76 touches and makes electrical connection with terminal 50. The other line of electric cord 16 is secured to terminal 58.

An adjustment stud 80 is threadably received within a bushing 82 connected to conductor 72 midway of its ends. A groove 84 is formed in the lower end of stud 80 for admission of a screw driver to permit adjustment of the height of the stud. An insulator 86 is secured to the opposite end of the stud. Insulator 86 is adapted to contact thermo-sensitive strip 68.

Thermo-sensitive element 68 is preferably in the form of a bi-metallic strip and serves in a well-known manner to ensure that the temperature of liquid in the container remains within a preselected range.

When the liquid within the kettle is below or within the preselected temperature range, contact 76 will contact terminal 50 and current will flow through heating element 48. As the temperature of the liquid rises, bi-metallic strip 68 will swing downward and into contact with insulator 86. When the temperature of the liquid reaches the upper limit of the preselected range, strip 68 will exert a sufficient downward force on insulator 86 so that contact will be severed between element 76 and terminal 50. Current will therefore cease to flow through the heating element.

Similarly, when the temperature of the liquid is below the preselected range, the strip will move out of contact with insulator 86 and the inherent resiliency of element 72 will serve to return element 76 to terminal 50 thereby reactivating heating element 48.

By adjustment of stud 80, the upper limit of the temperature of the liquid within the kettle can be varied.

It will be understood, of course, that modifications can be made in the preferred embodiment of the present invention as described hereinabove without departing from the scope and purview of the appended claims.

What I claim as new and desire to protect by Letters Patent of the United States is:

1. A liquid heating assembly including: a container for liquid having a lower wall and side walls extending upwardly from the lower wall; a heating element disposed within said container and having an electric terminal at each end thereof, one said terminal adapted to be connected to one line of a source of electric current, a false bottom mounted within said container and defining a liquid-tight compartment therein within which said terminals are housed; a resilient conductor, adjustment stud and bi-metallic strip all mounted within said compartment, an electrically insulated stud interconnecting at one end said false bottom to an intermediate portion of said heating element externally of said compartment, said insulated stud extending downwardly through said liquid-tight compartment and connected at the other end to said lower wall, said resilient conductor and said bi-metallic strip both being pivotally mounted to said insulated stud, an adjustment stud threadably mounted to said resilient conductor and adapted to contact said bi-metallic strip, said resilient conductor connected to the other line of the source of electric current and having a contact adapted to make and to break electrical connection with the other electrical terminal of said heating element, said bi-metallic strip when the temperature within the compartment exceeds a pre-determined value acting on said adjustment stud thereby applying a force to said conductor opposed to its bias and causing said contact to break connection with said other electrical terminal when the temperature of the liquid exceeds a pre-determined temperature.

2. The liquid heating assembly as claimed in claim 1 wherein said lower wall has a lower surface which defines an exterior surface of said assembly, said heating element is mounted in the lower zone of said assembly and said false bottom has a top and a lip integral therewith, said top being in spaced relation with said lower wall but having an area substantially less than that of said lower wall, said top further having an outer edge conforming to a portion of the inner side wall and secured thereto, said lip depending generally vertically downwardly from said top and secured to said side and lower walls whereby said false bottom and that portion of said container wall extending downwardly and disposed beneath said false bottom define said liquid-tight compartment, said heating element extending from said compartment into the liquid-containing container and having an intermediate portion overlying and in contact with said top, liquid within said container resting on that portion of the lower wall not beneath said false bottom.

* * * * *